United States Patent [19]

Jacobs

[11] Patent Number: 4,677,157

[45] Date of Patent: Jun. 30, 1987

[54] BUMPER REPAIR COMPOSITION

[76] Inventor: Richard Jacobs, 14822 Florwood Ave., Hawthorne, Calif. 90250

[21] Appl. No.: 740,256

[22] Filed: Jun. 3, 1985

[51] Int. Cl.$^4$ .............................................. C08G 18/38
[52] U.S. Cl. .................................. 524/789; 156/331.4; 427/385.5; 427/393.5; 428/423.1; 525/453; 525/454; 525/460; 528/60; 528/65; 528/66; 528/75; 528/78; 528/82; 528/905
[58] Field of Search ................ 524/789; 525/453, 454, 525/460; 528/60, 65, 66, 75, 78, 82, 905; 156/331.4; 427/385.5, 393.5; 428/423.1

[56] References Cited

U.S. PATENT DOCUMENTS

| Re. 31,389 | 5/1983 | Brauer et al. | 528/60 |
| 3,691,117 | 9/1972 | Messerly | 528/60 |
| 4,045,527 | 8/1977 | Babayan et al. | 528/60 |
| 4,400,498 | 8/1983 | Konishi et al. | 528/60 |
| 4,476,292 | 10/1984 | Ham et al. | 528/60 |

Primary Examiner—Maurice J. Welsh
Attorney, Agent, or Firm—Louis J. Bachand

[57] ABSTRACT

Method and composition are provided for repair of bumpers and like auto body components formed of synthetic organic polymers, by the use of a urethane polymer having a crystalline polymer phase distributed in a noncrystalline polymer phase by virtue of differential reactivity of the urethane forming reagents.

54 Claims, No Drawings 4,677,157

BUMPER REPAIR COMPOSITION

TECHNICAL FIELD

This invention has to do with compositions useful for the repair of automobile bumpers and other body parts, and more particularly is concerned with novel urethane polymer systems which afford rapid cure to sandable state, excellent adhesion and toughness useful in the auto body repair art.

BACKGROUND OF THE INVENTION

It is known to use urethane polyumers in the repair of bumpers and like synthetic organic polymer body components, although such use is far less than use of epoxy and other curable resins than urethane. Known urethanes, however, are not as hard as desired. The chemistry of the urethane polymer is such that attempting to make a harder polymer requires relatively higher amounts of isocyanate reagent. In the auto repair situation, however, relatively higher amounts of isocyanate are desirably avoided since cure times to a sandable stage are increased, necessitating delays in finishing the repair, the painting and so on and increasing labor costs. Thus presently known urethanes have been limited in hardness so as to get fast sandability. An important factor in determining utility of polymer compositions for auto body repair is the rapidity with which the composition reaches a sandable condition and the ability of the polymer composition to sand in extremely thin sections, near the edge of a patch for example where the material is nearly feathered. Other properties such as hardness, shelf life, broad tolerance for mixing variations, adhesion to the substrate, colorability, ease of application and clean up and reproducibility from batch to batch, together with convenient packaging for efficient use are other criteria of value in assessing bumper repair compositions. Heretofore available compositions have been lacking some or all of these qualities to some degree, but the present composition affords them all and is a breakthrough in the art and science of urethane compositions which are adhesive, sandable, rapid curing, tough, and capable of providing predictable reproducibility in use after use.

SUMMARY OF THE INVENTION

It is accordingly an object of the invention to provide a novel urethane composition having the foregoing properties so as to be useful in bumper and auto body repair and other applications. Other objects will appear hereinafter.

These and other objects to become apparent hereinafter are realized in accordance with the invention by the method of preparing a composition useful for bumper repair, including mixing a first side comprising an isocyanato reagent under urethane polymer forming conditions simultaneously with a second side comprising a premix of an hydroxylated tertiary amine reagent having a first rate of reaction with the isocyanato reagent and a polyol reagent having a second, slower, rate of reaction with the isocyanato reagent, differentially reacting the premix reagents with the isocyanato reagent in phase segregated polymeric urethane forming relation.

In this and like embodiments, there is included also selecting an isocyanato reagent comprising 4,4'-diphenylmethanediisocyanate; cyclizing the 4,4'-diphenylmethane diisocyanate with itself before mixing for urethane polymer forming reaction; dissolving the cyclized 4,4'-diphenylmethane diisocyanate in noncyclized 4,4'-diphenylmethane diisocyanate before mixing under urethane polymer forming conditions; selecting an isocyanato reagent comprising the polyfunctional isocyanate addition reaction product of an aromatic polyfunctional isocyanate moiety and a hydrophobic organic polyfunctional active hydrogen moiety, e.g. selecting 4,4'-diphenylmethane diisocyanate as the aromatic polyfunctional isocyanate moiety, cyclizing the 4,4'-diphenylmethane diisocyanate and dissolving it in a solution of 4,4'-diphenylmethane diisocyanate in advance of the addition reaction, selecting Isonate 143-L or Mondur CD as the aromatic polyfunctional isocyanate moiety, and selecting hydroxyl-, thiol-, or carboxyl- poly-substituted compounds reactive with isocyanate groups as the hydrophobic organic polyfunctional active hydrogen moiety; selecting polytetraalkyleneoxide ether polyols, polyoxyalkyleneoxide ether polyols, aliphatic diols, or active-hydrogen substituted oligomers and fatty acid esters reactive with isocyanate groups as the hydrophobic organic polyfunctional active hydrogen moiety; selecting active hydrogen substituted silicone, fluorocarbon, fluorochlorocarbon, polytetraalkyleneoxide ether polyols, acrylic, vinyl, butadiene, cis-polyisoprene, polyamide, polyester, vinyl acetate, acrylamide, polyolefin, or Diels-Alder adducts of unsaturated polyester resin oligomers as the hydrophobic organic polyfunctional active hydrogen moiety; also selecting polytetramethyleneoxide ether polyol, D.B castor oil, or hydroxylated glyceryltriricinoleate triester reactive with isocyanate as the hydrophobic organic polyfunctional active hydrogen moiety; reacting the 4,4'-diphenylmethane diisocyanate and the hydroxylated glyceryltriricinoleate triester or like reagent in an inert vessel under high shear conditions at a temperature of about 80° C. for about one hour under a vacuum in excess of one millimeter of mercury; effecting the reaction to an amine equivalency in the product of below about 380; selecting as the polyol ragent a polyol preferentially forming a noncrystalline urethane polymer with the isocyanato reagent under urethane polymer forming conditions; as the polyol an hydroxyl-, thiol-, or carboxyl- poly-substituted oligomer having a molecular weight above about 500 and segregated phase defining reaction with the iscyanato reagent relative to said amine reaction under the same urethane polymer forming conditions; selecting a polyoxyalkylene ether polyol as the polyol reagent; selecting a polyoxyalkylene ether polyol having a molecular weight above about 1000; reacting the polyol with an isocyanato reagent comprising an adduct of liquid 4,4'-diphenylmethanediisocyanate and glyceryltriricinoleate triester to form a noncrystalline urethane polymer; reacting the polyol and isocyanato reagent adduct in admixture with a tertiary amine having a faster rate of reaction with the isocyanato reagent adduct than does the polyol; selecting as the hydroxylated tertiary amine reagent an alkaryl amine, arylamine, mercaptan, alkylene oxide adduct of alkanol amines, alkoxylated or epoxylated ethylenediamines, triazines, amines and hydrazines having hydroxyl, thiol, or carboxyl functionality; selecting as the hydroxylated tertiary amine reagent a compound having the formula:

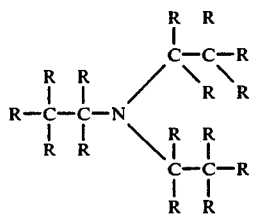

in which at least one R=R1, and each remaining R is R1 or R2, and:
in which:
R1=—OH;   —SH;   —N(CH2CH2OH)2;  —N(CH2CH3CH2OH)2;   —N(CHPb2CHCH3OH)2.
R3=—H; —Me; —Alkyl; —OAlk; —OMe; Halogen, —Aryl; —Aroyl selecting as the hydroxylated tertiary amine reagent the compound N'N'N'N'-tetrakis(2-hydroxypropyl)ethylenediamine; selecting as the isocyanato reagent 4,4'-diphenylmethane diisocyanate, and as the polyol reagent polyoxypropylene polyol triol; reacting the isocyanato reagent with the hydroxylated tertiary amine reagent to a crystalline urethane polymer, and with the polyol reagent to an amorphous polymer interdispersed with the crystalline polymer; employing as the first side per 100 parts by weight from 25 to 75 parts of 4,4'-diphenylmethane diisocyanate, from 3 to 25 parts of hydroxylated tertiary amine, glycerylricinoleate triester or polytetramethyleneoxide ether polyol adducted with the 4,4'-diphenylmethane diisocyanate, and any balance a colorant such as carbon black, or a filler or in amounts up to 5 parts by weight a sanding aid such as silica, and an effective amount of an organic thixatrope; and employing as the second side per 100 parts by weight from from 5 to 40 parts of the polyol, from 5 to 40 parts of the hydroxylated tertiary amine, and the balance zeolite, silica, including silane treated silica, vitreous particulate or mixtures thereof, and a thixatrope.

The invention further contemplates compositions comprising a urethane polymer reaction product of a first side comprising an isocyanato reagent simultaneously with a second side comprising a premix of an hydroxylated tertiary amine reagent and a polyol reagent which are differentially reactive with the isocyanato reagent to form a phase segregated urethane polymer.

In this and like embodiments, isocyanato reagent typically comprises 4,4'-diphenylmethanediisocyanate, the isocyanato reagent comprises cyclized 4,4'-diphenylmethane diisocyanate; the isocyanato reagent comprises the cyclized 4,4'-diphenylmethane diisocyanate dissolved in noncyclized 4,4'-diphenylmethane dissocyanate; the isocyanato reagent comprises the polyfunctional isocyanate addition reaction product of an aromatic polyfunctional isocyanate moiety and a hydrophobic organic polyfunctional active hydrogen moiety; the aromatic polyfunctional isocyanate moiety comprises 4,4'-diphenylmethane diisocyanate; the 4,4'-diphenylmethane diisocyanate is cyclized and dissolved in a solution of 4,4'-diphenylmethane diisocyanate; the moiety is Isonate 143-L or Mondur CD; the hydrophobic organic polyfunctional active hydrogen moiety comprises hydroxyl-, thiol-, or carboxyl- poly-substituted compounds reactive with isocyanate groups; the hydrophobic organic polyfunctional active hydrogen moiety comprises polyoxyalkyleneoxide ether polyols, aliphatic diols, or active-hydrogen substituted oligomers and fatty acid esters reactive with isocyanate groups; the hydrophobic organic polyfunctional active hydrogen moiety comprises active hydrogen substituted oligomers selected from silicone, fluorocarbon, fluorochlorocarbon, acrylic, vinyl, butadiene, cis-polyisoprene, polyamide, polyester, vinyl acetate, acrylamide, polyolefin, or Diels-Alder adducts of unsaturated polyester resin oligomers; the hydrophobic organic polyfunctional active hydrogen moiety comprises hydroxylated glyceryltriricinoleate triester reactive with isocyanate; the 4,4'-diphenylmethane diisocyanate and the hydroxylated glyceryltriricinoleate triester compounds are prereacted in a chemically inert vessel under high shear conditions at a temperature of about 80° C. for about one hour under a vacuum in excess of one millimeter of mercury; the prereacted compounds have an amine equivalency in the product of below about 380; the polyol reagent is a polyol preferentially forming a noncrystalline urethane polymer with the isocyanato reagent under urethane polymer forming conditions; the polyol is an hydroxyl-, thiol-, or carboxyl- poly-substituted oligomer having a molecular weight above about 500 and a segregated phase defining reaction with the iscyanato reagent than the amine reaction with the isocyanato reagent under the same urethane polymer forming conditions; the polyol reagent is a polytetraalkyleneoxide ether polyol or polyoxyalkylene ether polyol; the polyol has a molecular weight above about 1000; the urethane polymer is obtained by reaction of the polyol with an isocyanato reagent comprising an adduct of liquid 4,4'-diphenylmethanediisocyanate and polytetramethyleneoxide ether polyol, D.B. castor oil, or glyceryltriricinoleate triester and is a noncrystalline urethane polymer; tertiary amine reagent has a faster rate of reaction with the isocyanato reagent adduct than does the polyol reagent, whereby the urethane polymer comprises a crystalline portion produced by reaction of the amine and the adduct and a noncrystalline portion produced by reaction of the polyol and the adduct, the crystalline portion being dispersed through the noncrystalline portion; the hydroxylated tertiary amine reagent comprises an alkylene oxide adduct of alkanol amines, alkoxylated or epoxylated ethylenediamines, triazines, amines and hydrazines having hydroxyl, thiol, or carboxyl functionality, preferentially forming a crystalline urethane polymer with the isocyanato reagent under urethane polymer forming conditions; the polyol reagent is a polyol preferentially forming a noncrystalline urethane polymer with the isocyanato reagent under urethane polymer forming conditions, and the hydroxylated tertiary amine reagent a compound has the formula:

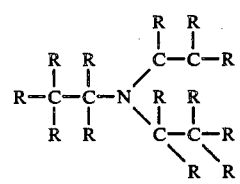

in which at least one R=R1 and each remaining R is R1 or R2, and:
in which:

R1=—OH; —SH; —N(CH2CH2OH)2; —N(CH2CH3CH2OH)2; —N(CH2CHCH3OH)2.
R2=—H; —Me; —Alkyl; OAlk; —OMe; —Halogen, —Aryl; —Aroyl;

or the polyol reagent is a polyol preferentially forming a noncrystalline urethane polymer with said isocyanato reagent under urethane polymer forming conditions, and the hydroxylated tertiary amine reagent is N'N'N'N'-tetrakis(2-hydroxypropyl)ethylenediamine; the isocyanato reagent is 4,4'-diphenylmethane diisocyanate, and said polyol reagent is polyoxypropylene polyol triol; the urethane polymer phase obtained by reaction of the isocyanato reagent with the hydroxylated tertiary amine reagent is a crystalline urethane polymer, and the urethane polymer obtained by reaction of said isocyanato reagent with said polyol reagent is an amorphous polymer phase interdispersed with said crystalline polymer; the polymer comprises per 200 parts by weight from 20 to 75 parts of 4,4'-diphenylmethane diisocyanate, e.g. Mondur CD, and from 10 to 50 parts of polytetramethyleneoxide ether polyol, D.B. castor oil, or glycerylricinoleate triester adducted with said 4,4'-diphenylmethane diisocyanate, from from 0 to 30 parts of said polyol, from 10 to 60 parts of said hydroxylated tertiary amine, and the balance paste adjuvants comprising silicas, zeolite, glass, organic thixatropes, and the like in effective amounts for the intended use.

The foregoing compositions are useful in combination with an automobile body component, e.g adhered to an automobile body component, formed in situ against a rigid substrate; as an adhesive for adhering a first material to a second material by being bonded to both the first and second material, e.g. by interposing the composition between said materials and reacting to the urethane polymer composition comprising interdispersed crystalline and noncrystalline portions of the polymer.

PREFERRED MODES

The term auto body component herein refers to bumpers, fenders, trunk lids, hoods and other auto body parts which are used in placement of sheet metal or otherwise, and which are subject to gouging, cracking, splitting, and like surface damage. Typically such parts are formed of uretane polymers, but various other polymeric compositions may also be used. The present repair composition is widely adherent when cured and can be used to bond itself or another material to a first material, and can be usefully formed in situ or preformed and then adhered to a substrate. The manifold uses of the present compositions are limted only by the needs in the marketplace for a tough urethane polymer capable of quick curing to a finishable state and reliably adhering to a chosen substrate.

As noted above, urethanes for bumper repair have been less hard than presently desirable. The use of higher concentrations of isocyanate reagent on the A side will increase hardness, but only at the cost of slower cure. It has now been discovered however that the use of a two-stage B side, one art of which is a tertiary amine as hereinafter described, enables harder product and with the rapid cure times to sandability needed.

In particular, the invention systems use a modified isocyanate reagent and in certain formulations intended for auto component repair maintains a 2.3 or less isocyanate functionality per mole, e.g. a 1.8 to 2.3 functionality on diphenylmethane diisocyanate, less than that realized with polymeric isocyanates. Functionality herein refers to number of equivalents of isocyanate per mole. Preferred as the isocyanate reagent is a cyclized diphenylmethane diisocyanate dissolved in noncyclized diphenylmethane diisocyanate such as is commercially available as Modur CD.

It has been found that whereas a prepolymer of this diisocyanate having an amine equivalence of about 400 when reacted with the B side at a 1:1 volume ratio forms a rubbery, soft urethane, e.g. having a Shore A hardness of 65-85. Reducing the amine equivalence to 380 or less and reacting with an equivalent volume amount of the B side, results in a reaction which is initially quite fast giving a faster work time. In the invention compositions there is a balance between work time and sanding readiness while obtaining a urethane final hardness similar to the substrate. Critical to this is the use of the tertiary amine described herein on the A side, which enables sanding without galling or reversion of the polymer with sanding heat.

Illustrative isocyanate compounds herein are: toluene diisocyanate (2,4-and 2-6 isomers and blends thereof), naphthylene diisocyanate, isophorone diisocyanate, methylenedicyclohexyldiisocyanate, hexamethylene diisocyanate, m-xylidenediisocyanate, paraphenylene diisocyanate, trimethylxylidene diisocyanate, cyclohexane diisocyanate, ortho-, meta- and para-phenylenediisocyanate, trimethylxylidenediisocyanate, 3,3'dimethyl 4,4'-diphenylmethane diisocyanate, 3,3'-dimethyl-4,4'-bipheynyldiisocyanate, and 3/3'-dimethoxy-4,4'-diisocyanate, dianisidine diisocyanate.

Illustrative amines herein are: alk-aryl amines; methylenediphenylmethanediamine, methylene-bis-2-chloroaniline, 4,4'-methylenediphenylsulphone-diamine, 4,4'-methylanthranilate, 2-bis(2'-aminophenylthio)ethane, triethyleneglycol-bis(4-amino benzoate), melamine, ethyloxylated aniline, propoxylated aniline, Illustrative polyols include ethyleneglycol, butanediol, trimethylol ethane, trimethylol propane, dipropylene glycol, propylene glycol, ethylene glycol, butenediol, butynediol, trimethylol propane, cyclohexanedimethylol, 1,4-di-hydroxycyclobutane, pentaerythritottetramercaptoproprionate, hexanediol, and b-dihydroxyethylether-hydroquinone.

The present compositions have typically hardnesses of 80 Shore A to 80 Shore D and are useful for the repair of urethane, SCM ABS, vinyl, fiberglass, epoxy, styrene, vulcanized natural neoprene, nitrile, SBR, EPR, EVA and EPDM rubber, metal, glass, cement, wood, ceramic, for auto body and rubber bumper repair, and general repair. The compositions have fast curability so that sanding can be accomplished within 15 minutes, even on thin edges without melting of the urethane, and exhibit the inherent resistance of urethanes to delamination because of their tenaceous adhesion to metal, plastic, rubber, fiberglass, and urethane substrates and virtually all substrates which have any active hydrogen functionality— which is virtually all surfaces except polyolefins and Teflon-type surfaces. Moreover, they resist delamination because the urethanes do not go through their glass transition during normal service temperature as epoxies do or degrade in humid and acid conditions as epoxy repair materials do.

In preparation, the first step is the synthesis of the Part A and Part B components. For the Part A component: 4,4'-diphenylmethane diisocyanate (sometimes MDI) is converted through the Wittig reaction into a cyclized form with itself. This cyclized structure is then dissolved in MDI to produce a storage-stable liquid form called liquid MDI having an overall isocyanate functionality of 2.1 to 2.2. Pure 4,4'-diphenylmethane diisocyanate could have been selected to produce the prepolymer, but this special form was used as the reactive isocyanate in order to produce a more storage-stable solution (stable towards freezing during storage). This liquid MDI form is commercially available from Upjohn Company as Isonate 143-L or from Mobay Chemical as Mondur CD.

A quasi prepolymer is synthesized from the addition reaction of liquid MDI (Mondur CD) and preferably polytetramethyleneoxide ether polyol, D.B. castor oil, or glyceryltriricinoleate triester (sometimes GTR). Placed into the reaction solution was fumed silica of a 0.04 microm size. This composition was placed in an inert reaction vessel which was capable of heating the reaction mixture, controlling its reaction temperature, high-shear mixing, and a vacuum exceeding one millimeter. The ingredients were high-shear mixed and heated to 80–85 degrees centigrade for one hour. During this time, a vacuum was pulled on the mixture in excess of one millimeter of mercury. The amine equivalent was measured and the synthesized mixture packaged in metal squeeze tube containers.

The Part A (prepolymer) component utilizes the extremely hydrophobic glyceryltriricinoleate triester hydroxy-functional compound, e.g. a refined castor oil. Other hydroxyl-functional compounds which could have been selected to achieve this hydrophobic property include such compounds as polyoxytetramethyleneoxide ether polyols, polyoxypropylene ether polyols, cyclohexanedimethylol, hexanediol, dipropylene glycol, tripropylene glycol, propylene glycol, ethylene glycol, diethyleneglycol, triethylene glycol, 1,3-butanediol, butanediol, propargyl alcohol, butyne diol, and the family of di- and trifunctional monomers or polyols, as well as silicone-, fluorocarbon-, fluorochlorocarbon-, acrylic-, vinyl-, butadiene-, cis-polyisoprene-, polyamide-, polyimide-, Diels-Alder adducts of unsaturated polyester resin-, polyester resins, vinyl acetate-, acrylamide-, polyolefin-, and any combination of the above oligomers modified to have active-hydrogen functionality. Carboxylic acid-functional-, thiol functional- and other active-hydrogen-functional oligomers or monomers can also be selected to be reacted with the isocyanate to form the prepolymer used as the isocyanato reagent.

The Part B (polyol reagent) is preferably partially composed of a high molecular weight polyol oligomer, e.g a 500 to 1000 up to 6000 molecular weight and higher liquid tri-functional polyoxypropylene ether polyol having some ethylene oxide capping to give secondary functionality. Any modification of the foregoing hydrophobic compounds may be selected as long as the reactivity of the polyol component its reactivity is slower than the tertiary amine coreactant or such as to define a phase segregated polymer relative to that defined by the amine reaction with isocyanate during formation of the polymer, so that the polyol forms essentially (i.e. thermodynamically) random structure by virtue having little ability to crystallize, or organize its structure, and it has the correct solubility to phase-segregate from the crystalline amine isocyanate adduct phase and to thereby form multi-phase matrix structures. It addition the polyol should have sufficient functionality to crosslink with the crystalline "zones" even if the user should mix the Part A and Part B components off-ratio enough to cause the cross-link density to be reduced, should have some tendency to cyclize or helicize, or form polymeric strands which are capable of being elongated when the multi-phase structure is stressed by an outside force, and most importantly, have the ability to return to its random or amorphous structure once the external force is relieved.

In combination with the just-described polyol is a hydroxyl-reactive amine compound capable of forming highly crystallized and ordered structures upon reaction with the isocyanate functionality in the Part A component. The amine reagent preferably is a somewhat ordered structure containing tertiary amine groups. While not wishing to be bound to any particular theory of operation, it is theorized that the tertiary amino groups of amine reagent herein, having a free-electron pair, orients that electron pair with some other moiety in the polymer solution (in its prepolymerized form) to resist unwanted melting during sanding in small less than one gram aliquots, whereby structures of adducts can be visualized which show a high crystalline and oriented structure capable of withstanding many kilocalories of input heat during a sanding process, and the highly organized nature of these crystalline zones can be supposed to have sufficient intramolecular forces to remain intact, while only amorphous zones would be unsupportive at their interstices and consquently "ablate" during the sanding process. In general it is significant that only the tertiary amino groups, not having reactive hydrogen functionality on the amino groups themselves in order to withstand instant reactivity, function herein as the amine reagent. In addition, the tertiary amino groups must have hydroxyl functionality adducted. The best means of adducting is to use ethylene oxide or propylene oxide so that only one ethylene or one propylene is adducted to each active hydrogen of the tertiary amino group. Illustrative amine reagents herein are: triethanol amine; tripropanol amine; combinations of diethanol-monopropanol amine, etc.; ethylenediamine tetra ethyoxylate; ethylenediamine tetrapropoxylate; ethoxylated and propoxylated 1,3,5-triazines, or other triazine isomers; cyclic combinations of ethylenediamine, hydrazine, amines which are ethoxylated, propoxylated or epoxidized in any form which leaves hydroxyl, or thiol functionality.

The Part B side also contains a zeolite, such as a sodiumaluminosilicate zeolite structure, e.g. capable of containing at least one molecule of water within its clathrate structure. It has been found that levels of zeolite substantially exceeding 5 percent up to as much as 85% substantially improve the working properties of the invention composition, and substantially improve the physical properties of the composition for finishing. Again, it is theorized that the zeolite is acting synergistically with the amine reagent in producing the required "through-cure" and "ablative" properities so significantly present in the invention composition.

The composition ingredients are high-shear mixed in the vessel, heated to 105–110 degrees Centigrade in order to ensure that all water is removed from the mixture. The filled polyol component was packaged in its own separate metal squeeze tube container for storage.

The composition of the Part A and Part B pastes when extruded and mixed desirably produce the correct viscosity pastes for extruding out of a number 10 orifice from a metal squeeze tube at nearly equal and controlled diameters. By extruding equal length lines of pastes the volume ratios are maintained at roughly 1.00 to 1.00. The achievement of control of the mix ratios is very important for maintenance of the stoichiometry of the reactive components and for achieving maximum molecular weight polymers. The composition is preferably built upon, e.g. the trifunctional ricinoleate, trifunctional high-molecular weight oligomer, and the tetra-functional N,N,N,N-tetrakis(2-hydroxyethyl or propyl)ethylenediamine in order to achieve an extremely high level of off-ratio or poor mixing forgiveness.

The Part A component, composed of 4,4'-diphenylmethane diisocyanate and 4,4'-diphenylmethane diisocyanateglyceryltriricinoleate triester prepolymer, reacts first with the active hydrogen groups (hydroxyls) on the tertiary amine hard segment crosslinkers of the Part B component. The reaction of 4,4'-diphenylmethane diisocyanate is fast with the teriary amine in comparison with the reactivities of the 4,4'-diphenylmethane diisocyanate prepolymers and the polyol reagent moieties. The fast reaction produces crystalline hard segments which align into morphological phases within the unreacted or partially-reacted polyol and 4,4'-diphenylmethane diisocyanate prepolymer phases. This crystalline composition within the liquid amorphous phases produces the malleable consistency of the mixture which occurs immediately after the start of mixing. Condensing the polymer at this point does not fracture the interstices because the amorphous phases have not yet cross linked with the crystalline phases. The forces of condensation merely cause laminar flow and alignment of the hard segments in the liquid soft segment medium. Polymerization continues until the soft segments crosslink the various hard segments and the polymer becomes intractable.

The fully-cured composition is a multi-phase matrix where the crystalline zones (phases) of the matrix are contained within the amorphous zones. The crystalline zones are tied to the amorphous zones through the prepolymer portion of the Part A component. The multi-phase matrix has the capability of uptaking external forces through thermodynamic ordering of the amorphous zones. The polyol has the capability of uptaking these stresses because the pendant methyl groups on e.g. the polyoxypropylene ether polyol provide barriers to rotation which can be easily overcome by the forces of deformation to produce a B-pleated sheet conformer if the need for uptaking work energy in the form of ordering (negative entropy) is required. Moreover, the pendant methyl groups provide only a low resistance to barriers of rotation allowing the number of possible structures to be high (high randomness) when external forces are relieved.

The composition continues to harden at a controlled rate until nearly full properties are achieved after 2 hours. Full properties are achieved after 24 hours.

EXAMPLES

| Example 1 | Eq. Wt. | Equiv. | Wt. % |
| --- | --- | --- | --- |
| Part A: | | | |
| Material | | | |
| Mondur CD | — | .430 | 62.0 |
| Polyether polyol | — | .007 | 15.0 |
| D.B. Castor Oil | — | .057 | 18.0 |
| Carbon black | — | — | 1.0 |
| Fumed silica | — | — | 3.0 |
| Organic Thixatrope | — | .003 | 1.0 |

-continued

| Example 1 | Eq. Wt. | Equiv. | Wt. % |
| --- | --- | --- | --- |
| | 274 | .363 | 100 |
| PART B: | | | |
| Polyether Polyol | — | .015 | 30.0 |
| N,N,N,N—tetrakis(2-hydroxypropyl) ethylenediamine | — | .342 | 25.0 |
| Sodium Aluminunosilicate Zeolite Powder | — | — | 8.0 |
| Quartz silica | — | — | 34.0 |
| Organic Thixatrope | — | — | 3.0 |
| | 280 | .363 | 100 |

The composition was mixed in equal volume amounts and placed against a gouge in a bumper. increased in hardness until in minutes it was easily carvable and shapeable. After 15 minutes, it was at the hardness to be sandable without harm to the filled in composition. The hardness properties continued to build gradually to form a very hard elastomer after one hour when it reached nearly full properties. Full hardness properties were reached after 24 hours.

I claim:

1. Method of preparing a composition useful for bumper repair and the like, including mixing a first side comprising an aromatic isocyanato reagent under urethane polymer forming conditions with a second side comprising premix of an hydroxylated tertiary amine reagent having a given rate of reaction with said isocyanato reagent, and a polyol reagent selected to have a slower rate of reaction with said isocyanato reagent, simultaneously reacting said isocyanato reagent with said hydroxylated tertiary amine to a crystalline urethane polymer phase, and with said polyol reagent to an amorphous polymer phase interdispersed with said crystalline polymer phase.

2. The method according to claim 1, including also selecting an isocyanato reagent comprising 4,4'-diphenylmethanediisocyanate.

3. The method according to claim 2, including also cyclizing said 4,4'-diphenylmethane diisocyanate with itself before mixing for urethane polymer forming reaction.

4. The method according to claim 3, including also dissolving said cyclized 4,4'-diphenylmethane diisocyanate in noncyclized 4,4'-diphenymethane diisocyanate before mixing under urethane polymer forming conditions.

5. The method according to claim 1, including also selecting an isocyanato reagent comprising the polyfunctional isocyanate addition reaction product of an aromatic polyfunctional isocyanate moiety and a hydrophobic organic polyfunctional active hydrogen moiety.

6. The method according to claim 5, including also selecting 4,4'-diphenylmethane diisocyanate cyclized with itself and dissolved in 4,4'-diphenylmethane diisocyanate as said aromatic polyfunctional isocyanate moiety.

7. The method to claims 6, including also selecting hydroxyl-, thiol-, or carboxyl- poly-substituted compounds reactive with isocyanate groups as said hydrophobic organic polyfunctional active hydrogen moiety.

8. The method according to claim 7, including also selecting polytetraalkyleneoxide ether polyols, polyoxyalkyleneoxide ether polyols, aliphatic diols, or active-hydrogen substituted oligomers and fatty acid esters reactive with isocyanate groups as said hydrophobic organic polyfunctional active hydrogen moiety.

9. The method according to claim 8, including also selecting active hydrogen substituted silicone, fluorocarbon, fluorochlorocarbon, polyether polyols, polytetraalkyleneoxide ether polyols, acrylic, vinyl, butadiene, cis-polyisoprene, polyamide, polyester, vinyl acetate, acrylamide, polyolefin, or Diels-Alder adducts of unsaturated polyester resin oligomers as said hydrophobic organic polyfunctional active hydrogen moiety.

10. The method according to claim 6 or 10, including also selecting polytetramethyleneoxide ether polyol, D.B. castor oil, or hydroxylated glyceryltriricinoleate triester reagent reactive with isocyanate as said hydrophobic organic polyfunctional active hydrogen moiety.

11. The method according to claim 10, including also reacting said 4,4'-diphenylmethane diisocyanate and said reagent in an inert vessel under high shear conditions at a temperature of about 80° C. for about one hour under a vacuum in excess of one millimeter of mercury.

12. The method according to claim 1 or 11, including also effecting said reaction to an amine equivalency in the product of below about 380.

13. The method according to claim 1, 2, 5, 6, or 10, including also selecting as the polyol reagent a polyol preferentially forming a noncrystalline urethane polymer with said isocyanato reagent under phase segregated urethane polymer forming conditions.

14. The method according to claim 1, 2, 5, 6, or 10, including selecting as said polyol an hydroxyl-, thiol-, or carboxyl- poly-substituted oligomer having a molecular weight above about 500 and a segregated phase defining reaction with said isocyanato reagent relative to said amine reaction with said isocyanato reagent under the same urethane polymer forming conditions.

15. The method according to claim 14, including also selecting a polytetraalkyleneoxide ether polyol or polyoxyalkylene ether polyol as said polyol reagent.

16. The method according to claim 15, including also selecting an ether polyol having a molecular weight above about 1000.

17. The method according to claim 16, including also reacting said polyol with an isocyanato reagent comprising an adduct of liquid 4,4'-diphenylmethanediisocyanate and glyceryltriricinoleate triester, D.B. castor oil, or polytetramethyleneoxide ether polyol to form a noncrystalline urethane polymer.

18. The method according to claim 17, including also reacting said polyol and isocyanato reagent adduct in admixture with a tertiary amine having a faster rate of reaction with said isocyanato reagent adduct than does said polyol.

19. The method according to claim 1, 2, 5, or 10, including also selecting as the polyol reagent a polyol preferentially forming a noncrystalline urethane polymer with said isocyanato reagent under urethane polymer forming conditions, and selecting as the hydroxylated tertiary amine reagent an alkaryl amine, arylamine, mercaptan, alkylene oxide adduct of alkanol amines, alkoxylated or epoxylated ethylenediamines, triazines, amines and hydrazines having hydroxyl, thiol, or carboxyl functionally.

20. The method according to claim 1, 2, 5, or 10, including also selecting as the polyol reagent a polyol preferentially forming a noncrystalline urethane polymer with said isocyanato reagent under phase segregated urethane polymer forming conditions, and selecting as the hydroxylated tertiary amine reagent a compound having the formula:

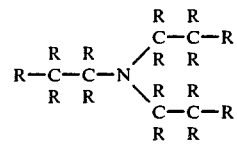

in which at least one R=R1, and each remaining R is R1 or R2, and:
in which:
R1=—OH;  —SH;  —N(CH2CH2OH)2; —N(CH2CH3CH2OH)2;  —N(CH2CHCH3OH)2;

R2=—H; —Me; —Alkyl; OAlk; —OMe; —Halogen; —Aryl; Aroyl.

21. The method according to claim 1, 2, 5, or 10, including selecting as the polyol reagent a polyol preferentially forming a noncrystalline urethane polymer with said isocyanato reagent under urethane polymer forming conditions, and also selecting as the hydroxylated tertiary amine reagent the compound N'N'N'N'-tetrakis(2-hydroxyethyl or propyl)ethylenediamine.

22. The method according to claim 20, including also selecting as the isocyanato reagent 4,4'-diphenylmethane diisocyanate, and as the polyol reagent polyoxypropylene polyol triol.

23. The method according to claim 1, including also employing as said first side per 100 parts by weight from 25 to 75 parts of 4,4'-diphenylmethane diisocyanate, and from 3 to 25 parts of hydroxylated tertiary amine, glycerylricinoleate triester adducted with said 4,4'-diphenylmethane diisocyanate, or polytetramethyleneoxide ether polyol adducted with said 4,4'-diphenylmethane diisocyanate, and the balance filler, colorant or sanding aid.

24. The method according to claim 1, including also employing as said second side per 100 parts by weight from 5 to 40 parts of said polyol, from 5 to 40 parts of said hydroxylated tertiary amine, and the balance zeolite, silica, vitreous particulate, or mixtures thereof.

25. Composition comprising a urethane polymer reaction product of a first side comprising an isocyanato reagent simultaneously with a second side comprising a premix of an hydroxylated tertiary amine reagent and a polyol reagent selected to be slower reacting with said isocyanato reagent than said amine reagent in noncrystalline polymer forming relation, said polymer reaction product comprising a crystalline phase produced by the reaction of said amine and said isocyanato reagent, and a noncrystalline amorphous phase produced by reaction of said slower reacting polyol and said isocyanato reagent, said crystalline phase being interdispersed with said noncrystalline amorphous phase.

26. The composition according to claim 25, in which said isocyanato reagent comprises 4,4'-diphenylmethanediisocyanate.

27. The composition according to claim 26, in which said isocyanato reagent comprises 4,4'-diphenylmethane diisocyanate cyclized with itself.

28. The urethane polymer according to claim 27, in which said isocyanato reagent comprises said cyclized 4,4'-diphenylmethane diisocyanate dissolved in noncyclized 4,4'-diphenylmethane diisocyanate.

29. The composition according to claim 25, in which said isocyanato reagent comprises the polyfunctional isocyanate addition reaction product of an aromatic polyfunctional isocyanate moiety and a hydrophobic organic polyfunctional active hydrogen moiety.

30. The composition according to claim 29, in which said aromatic polyfunctional isocyanate moiety comprises 4,4'-diphenylmethane diisocyanate.

31. The composition according to claim 30, in which said 4,4'-dipenylmethane diisocyanate is cyclized with itself and dissolved in noncyclized 4,4'-diphenylmethane diisocyanate.

32. The composition according to claim 30, in which said hydrophobic organic polyfunctional active hydrogen moiety comprises hydroxyl-, thiol-, or carboxyl-poly-substituted compounds reactive with isocyanate groups.

33. The composition according to claim 32, in which said hydrophobic organic polyfunctional active hydrogen moiety comprises polytetraalkyleneoxide ether polyols or polyoxyalkyleneoxide ether polyols, aliphatic diols, or active-hydrogen substituted oligomers and fatty acid esters reactive with isocyanate groups.

34. The composition according to claim 33, in which said hydrophobic organic polyfunctional active hydrogen moiety comprises active hydrogen substituted oligomers selected from silicone, fluorocarbon, fluorochlorocarbon, polyether polyols, polytetraalkyleneoxide ether polyols, methacrylic, vinyl, butadiene, cis-polyisoprene, polyamide, polyester, vinyl acetate, acrylamide, polyolefin, or Diels-Alder adducts of unsaturated polyester resin oligomers.

35. The composition according to claim 30, in which said hydrophobic organic polyfunctional active hydrogen moiety comprises polytetramethyleneoxide ether polyols, D.B. castor oil, hydroxylated glyceryltriricinoleate triester reagent reactive with isocyanate.

36. The composition according to claim 25, 26, 29, 30, or 33, in which said polyol reagent is a polyol preferentially forming a noncrystalline urethane polymer with said isocyanato reagent under crystalline urethane polymer forming conditions for said amine with said isocyanato reagent.

37. The composition according to claim 36 in which said polyol is an hydroxyl-, thiol-, or carboxyl-poly-substituted oligomer having a molecular weight above about 500 and a segregated phase defining reaction with said isocyanato reagent relative to said amine reaction with said isocyanate reagent under the same urethane polymer forming conditions.

38. The composition according to claim 37, in which said polyol reagent is a polytetraalkyleneoxide ether polyol or polyoxyalkylene ether polyol.

39. The composition according to claim 37, in which said polyol has a molecular weight above about 1000.

40. The composition according to claim 39, in which the urethane polymer is obtained by reaction of said polyol with an isocyanato reagent comprising an adduct of liquid 4,4'-diphenylmethanediisocyanate and polytetramethyleneoxide ether polyol, D.B. castor oil, or glyceryltriricinoleate triester and is a noncrystalline urethane polymer.

41. The composition according to claim 40, in which tertiary amine reagent has a faster rate of reaction with said isocyanato reagent adduct than does said polyol reagent, whereby said urethane polymer comprises a crystalline phase produced by reaction of said amine and said adduct and a noncrystalline phase produced by reaction of said polyol and said adduct, said crystalline portion being dispersed through said noncrystalline portion.

42. The composition according to claim 25, 26, 30, or 33, in which said polyol reagent is a polyol preferentially forming a noncrystalline urethane polymer phase with said isocyanato reagent under crystalline urethane polymer forming conditions for said amine with said isocyanato reagent, and said hydroxylated tertiary amine reagent comprises an alkaryl amine, arylamine, mercaptan or alkylene oxide adduct of alkanol amines, alkoxylated or epoxylated ethylenediamines, triazines, amines and hydrazines having hydroxyl, thiol, or carboxyl functionality preferentially forming a crystalline urethane polymer with said isocyanato reagent under urethane polymer forming conditions.

43. The composition according to claim 25, 26, 30, or 33, inwhich said polyol reagent is a polyol preferentially forming a noncrystalline urethane polymer with said isocyanato reagent under urethane polymer forming conditions, and said hydroxlated tertiary amine reagent has the formula:

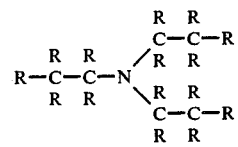

in which at least one R=R1 and each remaining R is R1 or R2, and:
in which:
R1=—OH;  —SH;  —N(CH2CH2OH)2; —N(CH2CH3CH2OH)2;  —N(CH2CHC-H3OH)2;
R2=—H; —Me; —Alkyl; OAlk; —OMe; —Halogen, —Aryl; —Aroyl.

44. The composition according to claim 25, 26, 30, or 33 in which said polyol reagent is a polyol preferentially forming a noncrystalline urethane polymer with said isocyanato reagent under urethane polymer forming conditions, and the hydroxylated tertiary amine reagent is N'N'N'N'-tetrakis(2-hydroxypropyl)ethylenediamine.

45. The composition according to claim 43, in which said isocyanato reagent is 4,4'-diphenylmethane diisocyanate, and said polyol reagent is polyoxypropylene polyol triol.

46. The composition according to claim 25, in which the urethane polymer phase obtained by reaction of said isocyanato reagent with said hydroxylated tertiary amine reagent is a crystalline urethane polymer, and the urethane polymer obtained by reaction of said isocyanato reagent with said polyol reagent is an amorphous polymer phase interdispersed with said crystalline polymer.

47. The composition according to claim 45, in which said polymer comprises per 200 parts by weight from 15 to 45 parts of 4,4'-diphenylmethane diisocyanate, from 3 to 8 parts of polytetramethyleneoxide ether polyol, D.B. castor oil, or glycerylricinoleate triester adducted with said 4,4'-diphenylmethane diisocyanate, from from 0 to 30 parts of said polyol, from 10 to 60 parts of said hydroxylated tertiary amine, and the balance a hardening filler.

48. The composition according to claim 46, in which said diisocyanate is cyclized before adducting.

49. The composition of claim 25, 26, 30, 33, 46 or 48 in combination with an automobile body component.

50. The composition of claim 26, 27, 32, 34, 49, or 51 adhered to an automobile body component.

51. The composition of claim 25, 26, 33, 46, or 48 formed in situ against a rigid substance.

52. Adhesive for adhering a first material to a second material said adhesive comprising the composition of claim 25, 26, 30, 33, 46, or 48 bonded to both said first and second material.

53. Method of adhering a first material to a second material including interposing the composition of claim 25, 26, 30, 33, 46 or 48 between said materials and reacting to said urethane polymer.

54. Composition useful in the repair of bumpers and the like, said composition comprising interdispersed crystalline and noncrystalline portions of the polymer claimed in claim 25.

* * * * *